US010915597B2

(12) United States Patent
Laptev et al.

(10) Patent No.: US 10,915,597 B2
(45) Date of Patent: Feb. 9, 2021

(54) SYSTEMS AND METHODS FOR MULTIOBJECTIVE OPTIMIZATION

(71) Applicant: Verizon Media Inc., New York, NY (US)

(72) Inventors: Nikolay Laptev, San Jose, CA (US); Akshay Soni, San Jose, CA (US); Yashar Mehdad, San Jose, CA (US); Jeya Balaji Balasubramanian, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 509 days.

(21) Appl. No.: 15/472,019

(22) Filed: Mar. 28, 2017

(65) Prior Publication Data

US 2018/0285473 A1   Oct. 4, 2018

(51) Int. Cl.
*G06F 16/957* (2019.01)
*G06F 7/02* (2006.01)

(52) U.S. Cl.
CPC .......... *G06F 16/9577* (2019.01); *G06F 7/026* (2013.01)

(58) Field of Classification Search
CPC .............................. G06F 16/9577; G06F 7/026
See application file for complete search history.

(56) References Cited

U.S. PATENT DOCUMENTS

| | | | | |
|---|---|---|---|---|
| 9,715,495 B1* | 7/2017 | Tacchi | ................ | G06F 17/2785 |
| 2010/0169324 A1* | 7/2010 | Shnitko | ................. | G06F 16/334 |
| | | | | 707/748 |
| 2011/0066497 A1* | 3/2011 | Gopinath | ........... | G06Q 30/0255 |
| | | | | 705/14.53 |
| 2011/0191168 A1* | 8/2011 | Schroedl | ............ | G06Q 30/0246 |
| | | | | 705/14.45 |
| 2011/0213655 A1* | 9/2011 | Henkin | .............. | G06Q 30/0251 |
| | | | | 705/14.49 |
| 2011/0258052 A1* | 10/2011 | Kakade | ................... | G06Q 30/02 |
| | | | | 705/14.69 |
| 2013/0167106 A1* | 6/2013 | Sinha | ....................... | G06F 8/10 |
| | | | | 717/101 |
| 2014/0222802 A1* | 8/2014 | Yan | .................... | G06Q 30/0241 |
| | | | | 707/727 |
| 2016/0004775 A1* | 1/2016 | Aleskerov | ................ | G06N 5/02 |
| | | | | 707/749 |
| 2017/0132866 A1* | 5/2017 | Kuklinski | ................ | G07D 7/20 |
| 2018/0060756 A1* | 3/2018 | Saha | ..................... | G06F 16/256 |
| 2018/0247222 A1* | 8/2018 | Tolomei | .................. | H04L 67/22 |

* cited by examiner

Primary Examiner — Matthew J Ellis
(74) Attorney, Agent, or Firm — Cooper Legal Group, LLC

(57) ABSTRACT

Methods and systems for ranking a plurality of articles for rendering on a website for a user account include receiving a request for accessing the website. Features are identified for the plurality of articles selected for rendering on the website. Each feature is associated with a value parameter having a value in a multi-dimensional vector space. A pair of solutions is identified for an article of the plurality of articles, wherein the pair of solutions identifies a portion of the multi-dimensional vector space that satisfies multiple objectives. A vector point defining the optimal solution is selected for the article from within the portion of the multi-dimensional vector space. The selected vector point is used in computing an article score for the article. The article score for the plurality of articles is used to identify and present a subset of the articles on the website for the user.

20 Claims, 9 Drawing Sheets

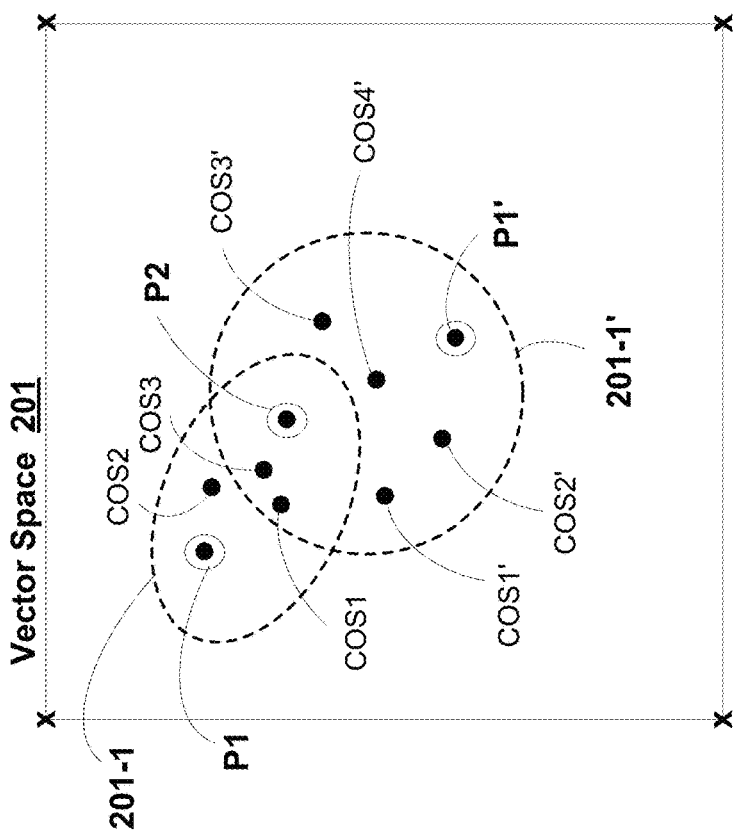

Vector Space 201-1 – defined using parent solutions (P1, P2) from mutation operation 1 for objectives with constraints
  - identifies optimal solutions (COS1, COS2, COS3...) from parent solutions (P1, P2) using crossover operations 1, 2, 3, ...

Vector Space 201-1' – defined using parent solutions (P2, P1') from mutation operation 2 after detecting change in one or more objectives/constraints
  - identifies optimal solutions (COS1', COS2', COS3'...) from parent solutions (P2, P1') using crossover operations 1, 2, 3, ...

Figure 4

SYSTEMS AND METHODS FOR MULTIOBJECTIVE OPTIMIZATION

FIELD OF THE INVENTION

The invention relates generally to ways of selecting and ranking articles for publishing on a website, and more particularly to selecting articles for publishing on a website for a user that optimize multiple, conflicting and dynamic business objectives while providing relevant content to the user.

BACKGROUND

Description of the Related Art

Since the advent of the Internet, websites have evolved over the years. Traditional websites included articles of content that was selected and presented in a manner that the content provider or content aggregator deemed optimal. These websites presented the same content to all users. As the use of the Internet expanded and became more main stream, the content aggregators became more flexible with their design and content presented on the website. Specifically, the content aggregators selected articles based on user profile of the user accessing the website, filtered the articles to identify a subset of articles based on the user's interest defined in the user profile, and presented the articles in a specific order. The articles presented on the website for a user are selected, ranked and arranged based on logic provided in a content ranking application that ranks the articles in accordance to a single business criterion (e.g., an objective, such as dwell time).

Business criteria can be broadly classified into objectives and constraints. Objectives correspond to meeting or improving goals of a particular business (e.g., content aggregator) while the constraints correspond to contractual understanding the business has with their business partners, such as content publishers that provide content for publishing on the website hosted by a content aggregator. When the business criterion identifies one objective or constraint, it is easy to filter and rank the articles of content in accordance to that objective or constraint. It is however challenging to rank the articles when there are multiple objectives and/or constraints to meet for the different articles that are received from multiple content providers. This may be due to the fact that some of the objectives may conflict with other objectives. As a result, when one objective is to be prioritized, other objectives need to be ignored or de-prioritized. Article ranking is more challenging when these objectives and constraints are dynamic in nature. The current content ranking application used by content aggregators, such as search engines, social news website, etc., typically use a function that maximizes a single scalar metric (i.e., objective) of interest and is not capable of handling more than one metric (e.g., a plurality of objectives with constraints) and is definitely not capable of handling the dynamic nature of the multiple objectives, constraints.

It is in this context that the embodiments of the invention arise.

SUMMARY

Embodiments of the disclosure provide an optimization application framework that identifies a plurality of articles of content from different content sources for including on a webpage rendered on a website, in response to a request to access the website received from a user. The optimization application, in an online setting, takes the multi-objective business criteria defined for each article into consideration and generates solutions for the article that identifies a set of vector points in a multi-dimensional vector space. These vector points satisfy the multiple objectives and are used to identify an optimal solution. The optimal solution is used to generate an article score for the article, which is then used to rank the article against other articles identified for the user. The optimization application then selects a subset of articles based on their relative ranking, formats the articles and presents the subset of articles to a user on a webpage of a website.

Unlike a single objective business criterion that yields a single globally optimal solution, a multi-objective business criteria yields a set of solutions, with each solution in the set being optimal for one of the plurality of objectives and sub-optimal on others. For each article, the optimization application described in the various embodiments, takes as input, data pertaining to the multiple objectives of interest (e.g., variables that may affect one or more of the multiple objectives with constraints defined for the article), evaluates various value parameters associated with the variables and selected from within a vector space, and outputs a set of solutions for the article that represent different optimal assignments for the value parameters associated with the variables. The set of solutions identifies a portion of the vector space that has to be explored and portions that can be left un-explored. The optimization application uses the set of solutions generated a for each of a plurality of articles selected for the user, for filtering and ranking the articles that are to be included on a website for the user. The optimization application takes into consideration algorithmic traffic shaping requirements for the website, performs personalized ranking for the users while taking into consideration the numerous objectives that are specific for each article, and selects articles for inclusion on the webpage for the website, wherein the selected articles improve overall quality and content relevancy for the user.

The conventional applications identified the articles of content for a user using a brute force search approach, wherein the different features were uniformly sampled to identify a solution that maximizes a single objective metric. The data for this approach was selected from a small sample of randomly chosen users and the selected users activities on the identified articles were recorded for different choices of the value parameters for the variables that spanned the entire vector space. The set of values of different value parameters for the variables associated with the article that best satisfied the single objective metric of this small group of users was considered to be optimal solutions for that objective metric for the general set of users. This approach of searching over the entire vector space of value parameters for each article for a small sample of users resulted in wasted network and computing resources, lower quality experience for the randomly chosen users due to presenting articles for different choices of the value parameters and monitoring users activities for the different choices of the value parameters, unnecessary delay due to computation of solutions that yielded less than optimal solutions. Further, this approach resulted in taking into consideration only a single objective metric.

The optimization application described herein is significantly different from the conventional applications that were used to identify and present articles to a user. The optimization application performs a more principled and adaptive search of the vector space for the value parameters, in an online setting, by exploiting the work that has already been done in identifying a portion of the vector space in which a set of solutions that are optimal for an article are present and making a decision on which portion of the vector space to explore next and which portions to ignore. This process results in faster and more efficient way of identifying the articles, use of optimal network and processing resources to identify the articles, and presentation of articles that are meaningful and highly relevant to the users.

After presenting the articles, the optimization application may continue to monitor user interactions and periodically evaluate the articles that are presented to the user to ensure that the set of articles continue to satisfy the business objectives with constraints while ensuring that the selected articles continue to be meaningful and relevant to the user. When a subsequent request is received from the user, the optimization application may elect to maintain the same set of articles or refine the set of articles to maintain the quality, and such election is made based on the evaluation of each article in the set that was identified for the user for servicing an earlier request. The election to refine the articles may be made when the optimization application detects a change in a constraint.

In response to detecting a change, the optimization application, in some embodiments, may determine that the set of solutions identified for an article is the best set of solutions and to consider including the article on the website for the user, or may generate a different set of solutions for the article resulting in the article being considered for inclusion or exclusion on the website for the user. User's interactions are monitored to ensure that the articles that are presented on the website not only optimize multiple business objectives (e.g., dwell time, click-through-rate, daily active users, monetization metrics, etc.,) but are also relevant to the user.

It should be appreciated that the present embodiments can be implemented in numerous ways, such as a process, an apparatus, a system, a device, or a method on a computer readable medium. Several embodiments are described below.

In one embodiment, a method for ranking a plurality of articles for rendering on a website for a user account is disclosed. The method includes receiving a request for accessing the website. Features are identified for the plurality of articles selected for rendering on the website based on user profile associated with the user account. Each feature is associated with a value parameter having a value that is defined within a multi-dimensional vector space. A pair of solutions is identified for an article of the plurality of articles. Each solution of the pair of solutions identifies a vector point within the multi-dimensional vector space that correlates with a specific value for each of the value parameters associated with the features of the article. The pair of solutions is assigned to the article and identifies a portion of the multi-dimensional vector space that satisfies multiple objectives with constraints defined for the article. A vector point is selected for the article from within the portion of the multi-dimensional vector space identified by the pair of solutions. The selected vector point defines an optimal solution selected for the article, which is used in computing an article score for the article. The article score for each of the plurality of articles is used to filter and rank the plurality of articles. The relative ranking of the plurality of articles is used in identifying and presenting a subset of the articles on the website for the user, in response to the request.

In another embodiment, a method for ranking a plurality of articles on a website for a user is disclosed. The method includes identifying features associated with the plurality of articles. Each feature is associated with a value parameter with a value defined from within a multi-dimensional vector space. An arbitrary value is assigned for the value parameter associated with each of the features of an article from the plurality of articles to define a first solution. The first solution corresponds to a first vector point in the multi-dimensional vector space. The value of the value parameter for the one or more features identified in the solution is adjusted to generate additional solutions for the article. Each of the additional solutions is represented as a distinct vector point in the multi-dimensional vector space. The first solution and the additional solutions associated with the article are evaluated to identify a pair of solutions for the article. Each solution of the pair of solutions identifies a specific vector point within the multi-dimensional vector space, wherein the specific vector point identifies the value for each of the value parameters associated with the features of the article. The pair of solutions identifies a portion of the multi-dimensional vector space that satisfies the multiple objectives with constraints defined for the article. A vector point is selected from within the portion of the multi-dimensional vector space identified by the pair of solutions. The selected vector point defines an optimal solution that is used in computing an article score for the article. The computed article score for each of the plurality of articles is used to rank the plurality of articles selected for the user based on a user profile of the user. The ranking of the plurality of articles is used in selection and presentation of a subset of the articles on the website for the user.

In one embodiment, a system for ranking a plurality of articles selected for rendering on a website for a user is disclosed. The system includes an optimization application executing on a server computing device. The optimization application includes a plurality of inter-communicating logical modules that are used in identifying, selecting, filtering and ranking a plurality of articles of content and selecting a subset of articles for presenting on a website for a user, in response to detecting the user accessing the website. The optimization application includes a vector point identifier, a vector point evaluator, a vector space identifier, an article score computation module, and an article ranker. The vector point identifier is configured to identify vector points within a vector space by using different values for value parameters associated with various features of an article. The vector point evaluator is configured to identify a set of vector points that satisfy the objectives and constraints defined for an article. The vector space identifier is configured to use the set of vector points to determine a portion of the vector space to explore to identify an optimal vector point and portions of the vector space to not explore. The vector space identifier is further configured to identify an optimal vector point that satisfies the objectives and constraints. The article score computation module is configured to use the optimal vector point to compute an article score for the article as a function of the values associated with the value parameters for the various features associated with the article. The article ranker filters a plurality of articles selected for a user, using the computed article score to identify a subset of the articles and ranks the articles within the identified subset. The ranked articles are used to generate a webpage for a website and presented to the user on a client device, in response to the user requesting access to a website.

The various embodiments define an optimization application framework that takes as input, the data pertaining to objective variables of interest and candidate design variables that affect one or more objectives defined for an article including objectives with constraints, and output a set of solutions that represent different optimal assignments for the design variables, each solution within the set of solutions representing different trade-offs between the objectives of interest. The optimization application provides a scalable solution that takes into consideration the dynamic nature of the constraints, objectives. The optimization application promotes convergence to global optima for better traffic shaping to the website, while providing personalized article ranking for a user with quality and relevant articles.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings.

FIG. 4 illustrates a visual representation of an example vector space identifying portions of the vector space that is identified using a mutation operation for determining alternate solutions that satisfy the dynamically changed objectives or constraints for an article, in accordance with one embodiment of the present invention.

DETAILED DESCRIPTION

Embodiments of the present invention provide system, computer readable media storing an application with program instructions, and methods for ranking a plurality of articles of content for rendering on a website for a user. The various embodiments define an application framework that is used to find solutions for an article of content that maximize on various objectives defined for the article. These solutions satisfying the various objectives with constraints, including traffic requirements and other constraints promised to different content providers, are found for online data, under settings where the objectives and constraints change dynamically. The various embodiments described herein use a form of online machine learning algorithms and/or other logic to model each objective defined for an article separately to identify a set of parent solutions. Hyper-mutation and adaptive simulated binary crossover operators are used to create a child solution from the set of parent solutions. The child solution is identified by value parameters for the different features of the article, and the parent solutions, child solution adapt to dynamics of the objectives. The child solution is optimal and is diverse in terms of trade-offs between the various objectives. The application framework is robust enough that when the constraints for an objective are too stringent, the application framework will still return solutions that best meet the constrained objective, while also optimizing on other objectives. Even when some constraints may be impossible to meet, the application framework will return solutions that at least try to meet some parts of the constraints. The solutions that are returned by the application framework are Pareto Optimal solutions that identify the best possible solutions for the different objectives.

With the general understanding of the invention, detail description of the various embodiments will now be described with reference to the drawings.

Figure 1:
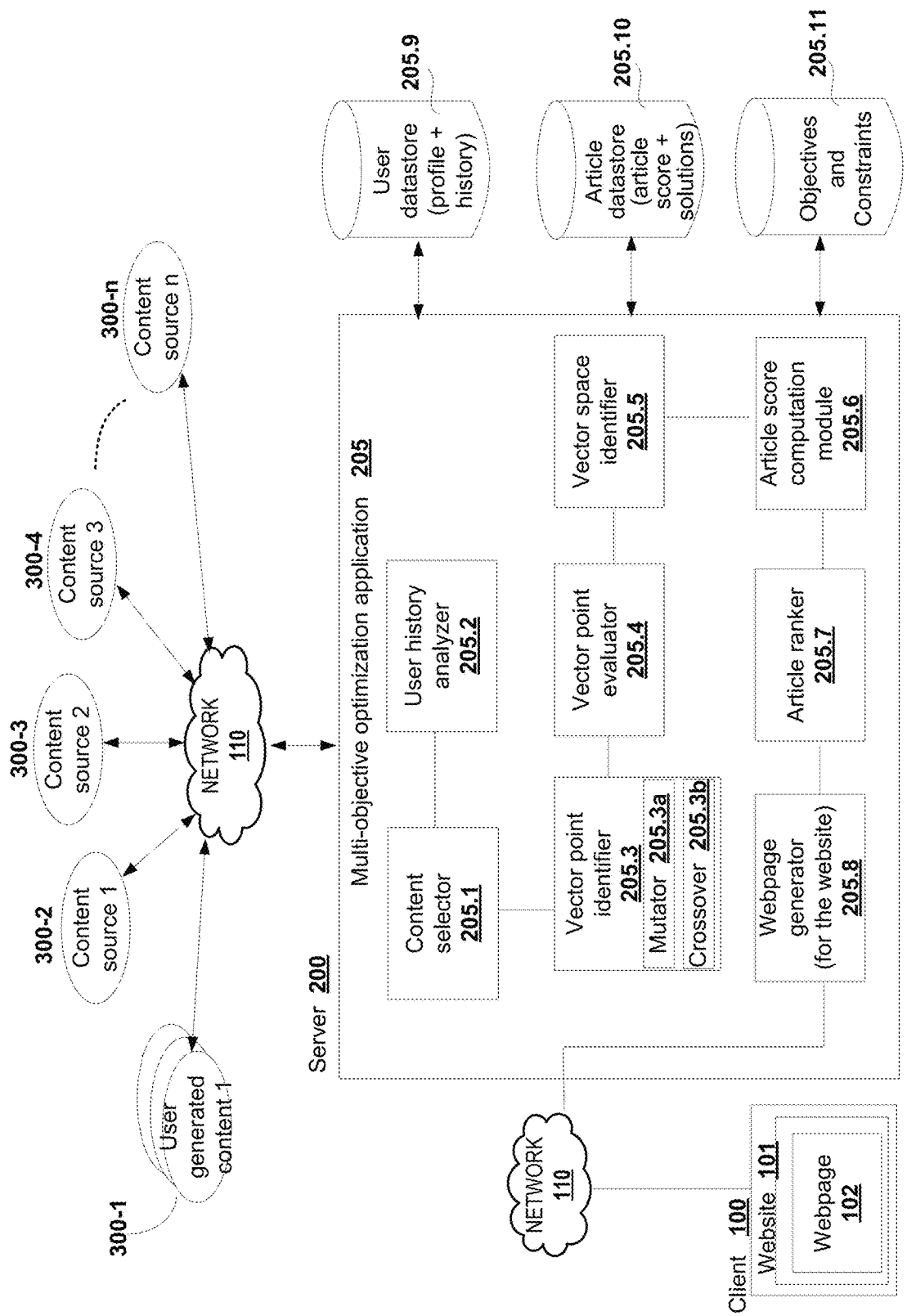
FIG. 1 illustrates a simple block diagram of a system that is used for evaluating different articles identified for a user and for selecting a subset of articles for presenting on a webpage of a website for the user, in accordance with an embodiment of the present invention.

FIG. 1 illustrates a system that is used for ranking a plurality of articles of content that are selected for rendering on a website for a user. The system includes a client device 100 that communicates with a server computing device 200 over a network 110, such as the Internet. The client device 100 can be any computing device that is connected to the network 110 such as the Internet, through wired or wireless connection to communicate with the server computing device 200. The client device 100 may be a mobile computing device, desktop computing device, laptop computing device, etc. The client device 100 provides a user interface (not shown) for a user to provide user authentication information and to request access to a website.

The server computing device 200 can be a stand-alone computer, a network of computers, a virtual machine, a network of virtual machines, part of a cloud computer network, etc., and is configured to connect to the network 110, so as to communicate with the client device 100. The server 200 may be a host content server that provides articles of content or may be a content accumulator that interacts with a plurality of content sources to accumulate, aggregate articles of content from different content sources, rank the articles and present the articles of content based on relative ranking, on a webpage of a website hosted by the server. The articles of content may include multimedia content, such as streaming content, textual content, video content, television content, game content, promotional media content, graphical user interface (GUI) content, audio content, social media content, pictures, photos, weblogs, broadcast content, or any other content that can be rendered on a webpage or consumed by a user.

A host server 200 may identify thousands of articles from different content sources that match the request of the user. However, not all articles can be presented to the user due to space and other resource constraints. The host server identifies a subset of articles by ranking the articles and presenting the subset of articles on a webpage of a website hosted by the host server.

The articles are ranked to maintain the quality and relevancy for the user and to optimize on multiple objectives that drive the business needs of the host server. Some example business objectives for optimizing may include maximizing on dwell-time, maximizing or minimizing on click-through rates (CTR), daily active users and monetization metrics. The above list should not be considered exhaustive or limiting and that other objectives may also be considered for optimization. It is easier to identify articles that best match a single business objective, such as dwell time or click-through-rate, but very hard when multiple objectives need to be satisfied. It is especially challenging, since some of these business objectives may be conflicting, in the sense that if one of them increases, other objectives may be forced to decrease. For example, considering the above list of objectives, as dwell-time increases, the CTRs decrease. The optimizing becomes further complicated when certain of the objectives are subject to constraints, such as traffic shaping requirements driven by contracts or agreements between content providers and content aggregators (e.g., partnership agreements between content aggregators and content providers that specify providing certain content in return for specific target traffic or revenue promises) and when the objectives, constraints are dynamic in nature. To address the complex optimization requirements, a multi-objective optimization application (or simply "optimization app") 205 is provided on the server 200.

The optimization app 205 is configured to evaluate the articles of content obtained from various content sources based on user profile associated with a user account from which access request was received, to identify a sub-set of the articles that are relevant to the request. The user profile provides information on browsing history of a user associated with the user account to enable the optimization app 205 to determine the user's articles of interest. Thousands of articles may be identified based on the user profile of the user. The optimization app 205 filters these articles based on article score generated for each article during the evaluation process to identify the sub-set of articles for the user. The articles in the identified sub-set are relevant to the user, and satisfy the business objectives and constraints specified for each of the articles or come close to satisfying the business objectives. The sub-set of articles is presented on a webpage of a website accessed by the user, in a ranking order that reflects the quality and relevancy of the articles selected for the user. The evaluation and identification of the relevant articles are done in an online setting and in an ongoing manner every time the user requests access to the website.

To assist in the identification of relevant articles, the optimization app 205 includes a plurality of logical components for evaluating and ranking the numerous articles of content identified for a user. Some of the logical components include vector point identifier 205.3, vector point evaluator 205.4, vector space identifier 205.5, article score computation module 205.6, and an article ranker 205.7. It should be noted that the aforementioned logical components are exemplary and that fewer or more logical components may be included in the optimization app 205. In addition to the aforementioned logical components, the optimization app 205, in one embodiment, may also include a content selector 205.1 and a user history analyzer 205.2 that are used to identify the articles of content for a user. In an alternate embodiment, the content selector 205.1 and the user history analyzer 205.2 are separate from the optimization app 205 and the optimization app 205 may interact with the content selector 205.1 and the user history analyzer 205.2 to identify the articles for the user. In one embodiment, a webpage generator 205.8 may be part of the optimization app 205 that is used to generate the webpage with the identified articles for the user. In an alternate embodiment, the webpage generator 205.8 may be separate from the optimization app 205 and the optimization app 205 may interact with the webpage generator 205.8 to provide information on the identified articles to the webpage generator 205.8 so that the articles may be presented on a webpage at the website accessed by the user on the server 200. The functions of the various logical components of the optimization app 205 will now be described in detail.

In one embodiment, the content selector 205.1 is configured to verify a request for access to a website received from a user account. The request, in some embodiments, may include user authentication data, such as sign-in credentials associated with the user account. The content selector 205.1 interacts with user datastore 205.9 to retrieve user account related information to authenticate the user account. The user datastore 205.9 is a repository that stores user account related data including authentication data, user profile data and usage history of each user that accesses the website hosted by the server 200. Upon successful authentication, the content elector 205.1 communicates the user account related information to the user history analyzer 205.2. In one embodiment, the user history analyzer 205.2 is separate from the content selector 205.1. In another embodiment, the user history analyzer 205.2 may be integrated within the content selector 205.1.

The user history analyzer 205.2 uses user identifier from the user account related information to query the user datastore 205.9 for the usage history of the user associated with the user account. The usage history is used to determine the user's preference of articles and usage pattern for each article. The usage history and user preference information is communicated by the user history analyzer 205.2 to the content selector 205.1, which then interacts with a plurality of content sources 300-1, 300-2, 300-3, 300-4, . . . 300-$n$ to identify articles of content for serving to the user account, in response to the request. The articles of content include user generated content, social media content, broadcast content, streaming content, and content generated by other content providers.

The articles identified by the content selector 205.1 are then forwarded to the vector point identifier 205.3. The vector point identifier 205.3 examines each of the articles to identify features of the articles. In one embodiment, a feature of the article can be an objective variable of interest that is to be optimized or a design variable that affects one or more objectives based on user interest, user interaction, user ranking, etc. For example, for ranking articles, an objective variable may include total clicks (i.e., click-through-rates (CTR)) and dwell-time for an article. Additionally, the objective variable may include a freshness factor. The design variable is a variable that can be controlled and is influenced by user activities. Some examples of design variables that can be used in ranking articles include amount of user interest (expressed by number of views, number of likes, number of comments garnered for an article), webpage presentation, content publisher or content generator reputation, etc.

The vector point identifier 205.3 interacts with the objectives and constraints datastore 205.11 to identify various objectives (including objectives with constraints) specified for each identified article. The vector point identifier 205.3 then interacts with article datastore 205.10 to determine if each of the articles identified for the user includes an assigned set of solutions that optimize the objectives defined for the respective article. The article datastore 205.10 is a repository that stores, for each article, an article identifier, article content or a link to the content, assigned solutions (if any) and article scores (if any). A solution for an article is defined as a vector point within a vector space that satisfies or addresses at least some of the objectives of interest specified for the article. The vector space is a multi-dimensional vector space, wherein each dimension corresponds to a feature of an article that is to be optimized. For example, for m different objectives of interest that needs to be optimized for an article, the vector space is defined as an m-dimensional vector space with vector points that encompass all objectives that need to be simultaneously optimized. Thus, for m different objectives, a solution for an article consists of a set of solutions, wherein each solution in the set is optimal for one of the m objectives, while it is sub-optimal on others. The vector point corresponding to each solution includes specific set of value parameters for the features of the article. In one embodiment, the set of solutions is a pair of solutions with each solution in the pair being an extreme solution for one of the objectives of the article. The range of solutions in-between the two extreme solutions represent trade-offs between the different objectives. Each solution in the pair is a Pareto optimal solution for the article and the set of solutions defined by the pair of extreme solutions is a set of all Pareto optimal solutions. Thus, the multi-dimensional vector space spans all values of value parameters associated with all the features (i.e., objective variables or design variables that need to be optimized) of the article and the pair of solutions is used to identify a small portion of the m-dimensional vector space in which the in-between solutions lie. The portion of the m-dimensional vector space is also multi-dimensional.

An article identified for presenting to a user may be associated with assigned solutions if the article was previously evaluated in response to the same or similar request from the user or other users, or a request from other users that have similar user profile as the user. On the other hand, if the article is a new article (e.g., newly generated either by another user or a content provider), then solutions will have to be generated for the article as the article will not have any assigned solutions.

In one embodiment, for an article that does not have any assigned solutions, the vector point identifier 205 engages a mutator operator 205.3a to find the pair of solutions. The mutator operator 205.3a begins by first assigning an arbitrary value to value parameter associated with each feature of the article to generate a first solution. The first solution is a vector point within a multi-dimensional vector space defined by specific values for the value parameters defined for the various features of the article. The mutator operator 205.3a then adjusts the value of the value parameter of the one or more features of the article to generate additional solutions. Each of the additional solutions identifies a distinct vector point in the multi-dimensional vector space. The first and additional vector points generated for the article are then evaluated.

Figure 2:
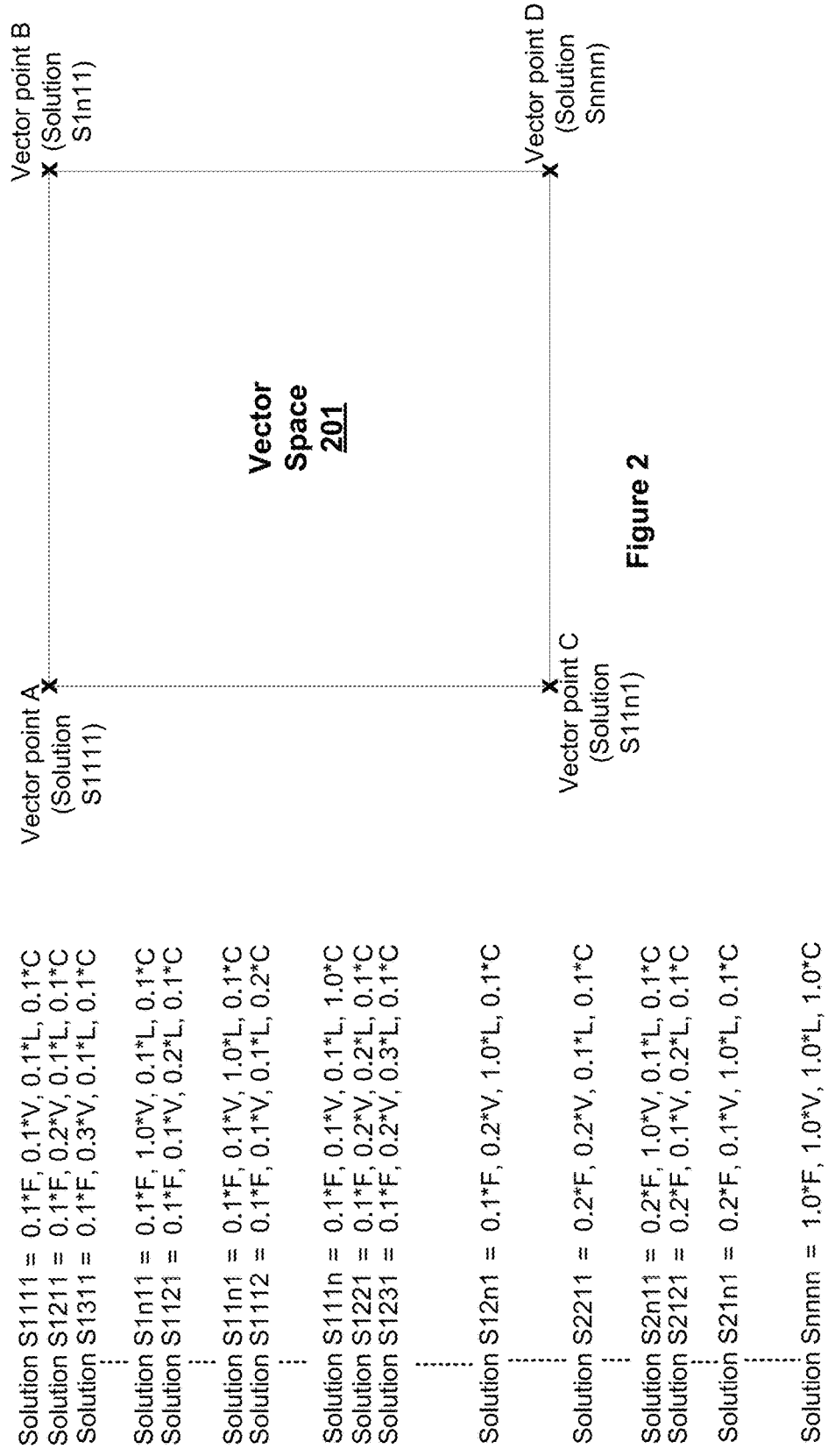
FIG. 2 illustrates the possible solutions identified by a multi-objective optimization application that are used to identify articles for a user, in accordance with an embodiment of the invention.

FIG. 2 illustrates an example vector space 201 that spans all values of value parameter associated with objectives of interest (i.e., features) of the article and the possible solutions that can be identified by the mutator operator 205.3a. The articles may include features that may be a combination of objective variable and design variables. For example, some of the features identified for the articles may include freshness factor (objective variable), views, likes, and comments (design variables). The design features correspond to user activities at the respective articles. In the example illustrated in FIG. 2, the number of features identified for the article is 4 and the vector space is a 4-dimensional vector space. It should be noted that although four features have been identified for the articles, fewer or additional features may be identified and the number of dimensions of the multi-dimensional vector space varies accordingly. Each of the features is associated with a value parameter with value assigned from the 4-dimensional vector space.

In the above example, the mutator operator 205.3a may generate different solutions by assigning different values in the multi-dimensional vector space, for the value parameter associated with the different features. In one embodiment, the value range for each value parameter may be between 0 and 1. For example, mutator operator 205.3a may identify vector point A by assigning a value of 0.1 for each feature's value parameter. Similarly, vector point B may be identified by assigning a value of 0.1 to the freshness, likes and comment features and a value 0.2 to the views feature, from the above example. Vector points C and D may be similarly identified. It should be noted herein that the vector space in FIG. 2 has been depicted as a two-dimensional vector space for depiction purposes, whereas in reality it is a multi-dimensional vector space with the vector points defined in the multi-dimensional vector space. Further, the values identified for the various vector points A, B, C, D are just examples. As can be seen from FIG. 2, the possible solutions that can be identified for the different features are numerous based on the combinations of the values for the value parameters. Each of the solutions identified by the mutator operator 205.3a is forwarded to the vector point evaluator 205.4 for evaluation.

The mutator operator 205.3a creates diversity in the solution set by introducing random changes to a solution to help escape local optima. The mutator operator 205.3a is therefore engaged for an article with no assigned set of solutions, or for an article that has assigned set of solutions but with one or more constraints that have changed (e.g., expiration of a partnership contract, change in agreements, etc.) thereby requiring revision of the solutions for the article.

Referring now to FIG. 1, the vector point evaluator 205.4 evaluates the first and the additional vector points generated by the mutator operator 205.3a to determine if a set of solutions exists that satisfy the multiple objectives, including objectives with constraints. In one embodiment, the vector point evaluator 205.4 may perform multiple evaluation passes to converge toward optimal solutions for the objectives. During each evaluation pass, the vector point evaluator 205.4 may converge on a smaller portion of the vector space. In an alternate embodiment, the vector point evaluator 205.4 may perform a single pass to identify the vector points defining the optimal solutions for the different multiple objectives.

Figure 3:
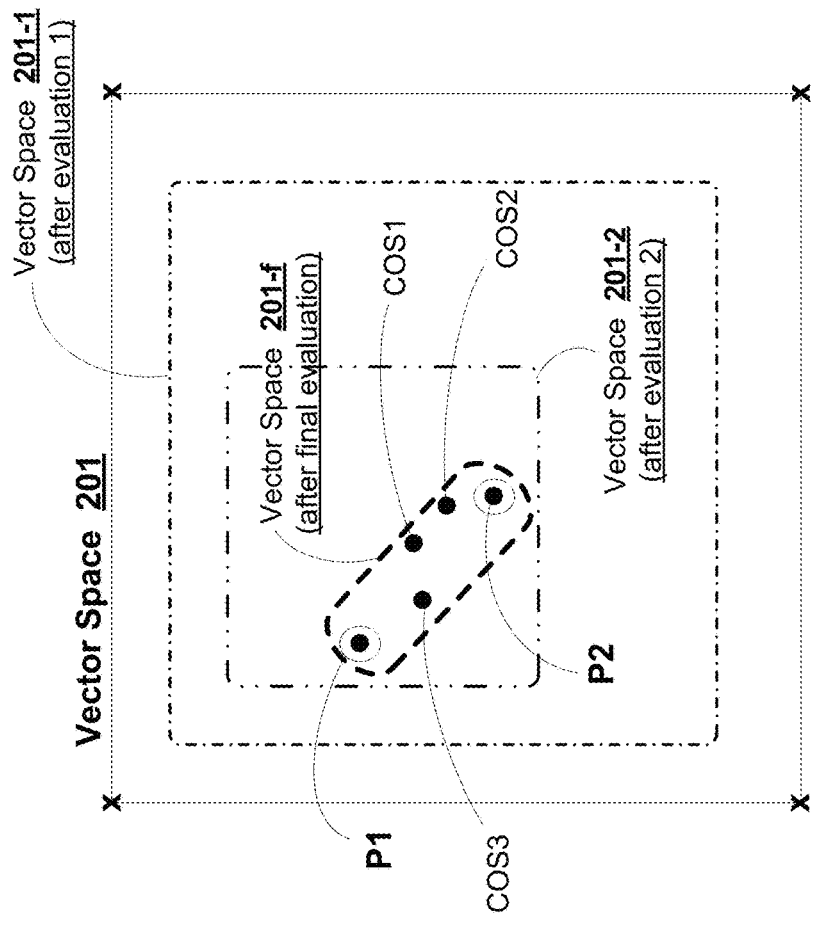
FIG. 3 illustrates a visual representation of an example vector space that is used by the optimization application for determining a portion of the vector space to explore for an article, in accordance with an embodiment of the present invention.

FIG. 3 illustrates an embodiment, wherein the vector point evaluator 205.4 performs multiple evaluation passes. After the first evaluation pass, the vector point evaluator 205.4 may identify a first portion 201-1 of the vector space 201 that includes vector points that are approaching the optimal solutions and should be explored further. The vector points in the first portion 201-1 are a sub-set of vector points in the overall vector space 201. After a second evaluation pass, the vector point evaluator 205.4 may identify vector points that are a sub-set of the vector points identified from the first pass. The vector point evaluator 205.4 may perform additional evaluation to determine if the solutions identified satisfy the objectives for the article or further convergence in the portion of vector space can happen. It is noted herein that each of the articles that is being evaluated includes content that is relevant for the user. As mentioned earlier, the solutions identified by the vector point evaluator 205.4 are a set of Pareto optimal vector points, wherein each vector point in the set identifies an extreme solution that is optimal for one of the m-objectives and sub-optimal for others. After a final evaluation pass, the vector point evaluator 205.4 may identify a pair of solutions represented by vector points P1, P2 that provide extreme solutions (i.e., Pareto optimal solutions) for all the features (design and objective variables) of the article. In an example embodiment illustrated in FIG. 3, the value parameters of the various features identified for vector point P1 may be identified to be 2, 3, 1 and 8 for the Freshness factor, Views, Likes and Comments features, respectively, wherein the values are decimal point equivalent as the values are identified by numbers that are between 0 and 1. In an alternate embodiment, the values may be identified by numbers that are between 0 and 9 or any other range. Similarly, for vector point P2 the value parameters of the features are identified to be 6, 4, 5 and 9, respectively. The identified pair of vector points P1, P2, is assigned as parent solutions for the article and is provided to the vector space identifier 205.5 for identifying a portion of the vector space to explore further.

In another embodiment, when an article has assigned solutions, the vector point identifier 205.3 communicates the article-related information to the vector point evaluator 205.4 to ensure that the assigned solutions are indeed optimal solutions. Due to dynamic nature of the objectives or constraints, it is appropriate to evaluate the assigned solutions for an article in an online setting every time the user requests access to the website for which the article is being considered, to ensure that the articles returned to the user are relevant content and satisfy the business objectives. For example, some objectives, such as CTRs, generally show temporal variations due to time-of-day, time-of-week, day-of-month effect. In another example, traffic shaping requirements defined by partnership contracts or agreements between a content provider and a content aggregator may change due to expiration of contracts, termination of agreements, etc.

In order to ensure that the assigned solutions are optimal for the article so that appropriate set of articles may be selected for the user, the vector point identifier 205.3 determines if the objectives or constraints have changed over time. If so, then the vector point identifier 205.3 evaluates the assigned parent solutions to see if the objectives are satisfied by the parent solutions. If not, then mutator operator 205.3a is automatically initiated. The mutator operator 205.3a may begin with the assigned parent solutions and determine children solutions. In one embodiment, during the mutation operation, the mutator operator 205.3a may determine that both the parent solutions are not solution and that new solutions need to be generated. In an alternate embodiment, the mutator operator 205.3a may determine that one of the parent solutions continues to be optimal while the second parent solution needs to be changed. FIG. 4 illustrates one such embodiment, in which one of the parent solution P2 is maintained as an optimal solution while the second parent solution P1 has been replaced with the newly generated parent P1'. In the embodiment illustrated in FIG. 4, P1', P2 are the children solution that was generated using the parents P1, P2 as base, as they provide an obvious variant of the parent solutions P1, P2. The identified pair of solutions is provided to the vector space identifier 205.5 for identifying a portion of the vector space to explore further.

Referring simultaneously to FIGS. 1 and 3, the vector space identifier 205.5 examines the vector points identifying the solutions provided by the vector point evaluator 205.4 after each pass, to identify a portion of the vector space in which the optimal solutions lie. Thus, with the vector points identified by the first pass of the vector point evaluator 205.4, the vector space identifier 205.5 examines the vector points identified by the vector point evaluator 205.4 to identify vector space 201-1, which is a smaller portion of the overall vector space 201. After the second pass, the vector space identifier 205.5 identifies a smaller vector space 201-2, and after the final evaluation pass, the vector space identifier 205.5 examines the pair of parent solutions represented by vector points P1, P2, for example, and identifies the portion of vector space 201-f that includes vector points corresponding to all Pareto optimal solutions that are between the pair of parent solutions P1, P2. Each vector point within vector space 201-f represent a range of trade-offs between the different objectives. It should be noted that since the vector points identified in the pair of solutions are from a multi-dimensional vector space, the portion of the vector space that is identified for the article from the parent or children solutions is also multi-dimensional. The identified vector space 201-f and the corresponding vector points are assigned to the article and stored in the article datastore 205.10, as shown in FIG. 1.

In one embodiment, the vector points P1, P2 representing the parent solutions for the article are used as starting points, by the vector point evaluator 205.4, when the article needs to be re-evaluated, when servicing a subsequent request from the same user or another user for which the article is being considered. In an alternate embodiment where the article has undergone a re-evaluation operation and a set of children solutions were generated and assigned to the article, the set of children solutions may be used as starting points to further refine the solutions assigned for the article.

Once the parent or children solutions have been determined using the mutator operator 205.3a, the vector space identifier 205.5 may engage the crossover operator 205.3b within the vector point identifier 205.3 to identify an optimal solution for the article from within the portion of the vector space 201-f identified by the pair of assigned parent or children solutions, for the article. The crossover operator 205.3b promotes convergence to a local optimal value. Referring to FIG. 3, a set of crossover solutions COS1, COS2, COS3, have been identified within the portion of the vector space 201-f defined by the set of parent solutions P1, P2. Each of the different crossover solutions may be optimal for specific objective(s) with or without constraints. Based on the current objectives defined for the article, a specific crossover solution (e.g., COS2) may be selected for the article.

In the embodiment where one or more children solutions are identified when the change in objectives is detected for the article, the crossover operator 205.3b identifies a different optimal solution that satisfies the changed objectives for the article. For example, the crossover operator 205.3b may identify that the optimal solution for the article may need to change from COS2 to COS 3 or COS1, for example, to satisfy the changed objectives. In some embodiments, even when the objectives have not changed, the crossover operator 205.3b may be initiated to seek an alternate optimal solution for the article from within the identified vector space 201-1, in order to test other solutions within the portion of the vector space 201-f.

Thus, as and when a request for the website is received from the user and an article is one of the articles identified for servicing the request, the vector point identifier 205.3, the vector point evaluator 205.4 and the vector space identifier 205.5 work together in an online manner to evaluate the parent solutions P1, P2, (if any) and the optimal solution assigned for the article to determine if the assigned set of solutions (i.e., P1, P2, COS2) continue to satisfy the objectives of the article. Based on the determination, the mutator operator and/or the crossover operator may be initiated. In one embodiment, the optimal solution selected for the article from the set of parent solutions defined by vector points P1, P2, is a linear solution between vector points P1, P2. In another embodiment, the optimal solution is a non-linear solution between vector points P1, P2. As the design variables represent user activities on each article, higher user activities for an article tend to correspond to better user-engagement (i.e., higher dwell-time) but lower CTR.

FIG. 4 illustrates an embodiment, wherein either one or both of the assigned set of parent solutions P1, P2, identifying a portion 201-1 of the vector space, does not satisfy the objectives defined for the article. As a result, one or more of the corresponding crossover solutions COS1, COS2 and COS3 may not be relevant optimal solution for the article, when the article is being considered for servicing subsequent request from the user. As part of finding a new set of solutions for the article, the mutator operator 205.3a begins with the assigned parent solutions P1, P2 and performs the mutation operation by changing one of the parent solutions (e.g., P1) to a value that is outside the portion of the vector space 201-1, while keeping the second parent solution (e.g., P2) as is. From the mutation operation, the mutator operator 205.3a identifies a set of solutions P2, P1' for the article, from which a corresponding portion of the vector space 201-1' is identified by the vector space identifier 205.5. The identified set of solutions P2, P1' is now considered to be a set of children solutions for the article.

Although, in the embodiment illustrated in FIG. 4, only one parent solution was mutated, it should be noted that this is only an example embodiment. In other embodiments, the mutator operator 205.3a may begin with the assigned parent solutions and mutate both the parent solutions to identify a set of children solutions for the article. Selection of which parent solution to mutate and which one to keep may be based on the evaluation of the assigned solutions of the article. The identification of an alternate pair of solutions for the article causes a corresponding change to the portion of the vector space from which to identify optimal solution for the article. In the example illustrated in FIG. 4, the portion 201-1 of the vector space 201 defined by the parent solutions P1, P2, for the article has changed to portion 201-1' defined by the set of children solutions P1', P2, with a portion overlapping with the portion 201-1. In other embodiments, the children solution identified for the article may define a vector space that does not have any overlapping portion with the vector space 201-1 defined by the parent solutions P1, P2.

Using the vector space portion 201-1', the crossover operator 205.3b may identify an optimal solution. For example, the crossover operator 205.3b may identify any one of the crossover solutions, COS1', COS2', COS3', COS4', etc., that span the portion of the vector space 201-1' defined by the set of children solutions P1', P2. As part of identifying the optimal solution, the crossover operator 205.3b may identify the crossover solutions COS1, COS3, that are part of the portion overlapping with the vector space 201-1. The optimal solution is selected from anyone of the crossover solutions identified within the portion of vector space 201-1'.

In one embodiment, the children solutions identified for the article may become the basis from which the mutator operator 205.3a may identify other grand-children solutions, when servicing subsequent requests in which the article is included. In an alternate embodiment, based on the objectives, the parent solution may continue to be the basis from which the mutator operator 205.3a may identify other children solutions for the article. In another embodiment, based on the objectives, either the parent or the children solutions may become the basis for identifying alternate solutions.

Figure 5:
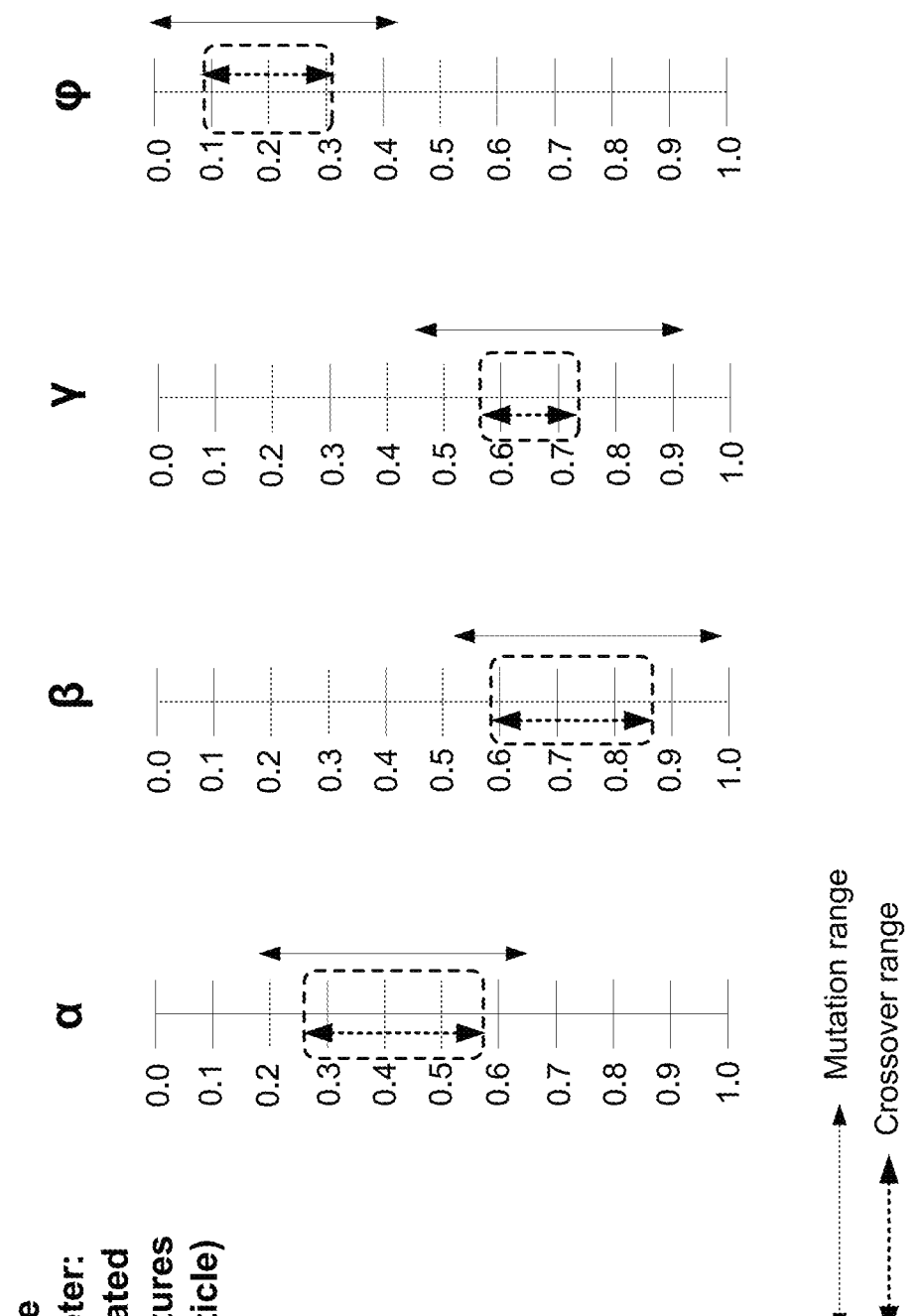
FIG. 5 illustrates the various value ranges of the value parameters associated with different features of an article, in accordance to an embodiment of the present invention.

FIG. 5 illustrates a sample mutation range and crossover range identified for the article, when new set of solutions are to be determined from a set of assigned solutions for the article, in one embodiment of the invention. The range of solutions identified from parent solutions (P1, P2) that are used as a basis for finding a new set of solutions are represented by the box with broken lines. The value parameters of each feature are identified by variables $\alpha$, $\beta$, $\gamma$, $\varphi$, respectively, wherein the range of value parameter $\alpha$ associated with the "Freshness factor" feature is identified to be between about 0.25 to about 0.55, the range of value parameter $\beta$ associated with the "Views" feature is between about 0.60 to about 0.85, the range of value parameter $\gamma$ associated with the "Likes" feature is between about 0.55 to about 0.75, and the range of value parameter $\gamma$ associated with the "Comments" feature is between about 0.1 to about 0.3, respectively. Of course, the above size and value range is a random example and is provided for illustrative purpose only. When a constraint changes, the mutator operator 205.3a performs mutation operation to identify vector points that are outside of the range defined by the broken-line box for one or more features associated with the article to arrive at a set of children solutions. Similarly, when an alternate optimal solution needs to be identified, the crossover operator 205.3b may identify any solution within the broken-line box identified for the various features.

Referring back to FIG. 1, the optimal solution is used to compute an article score, which is then used to determine if the article is to be selected with other articles for rendering on a webpage for the user, in response to the request. An article score computation module 205.6 is used to compute the article score for the article. In one embodiment, the article score is computed as a linear additive function of the features of the article and the corresponding value parameters of the features, wherein the features include objective variables and design variables. The values of the value parameters correspond to the vector point associated with the optimal solution. For example, if the features include freshness factor, views, likes and comments, and the value parameters of the respective features are represented as $\alpha$, $\beta$, $\gamma$, $\varphi$, (where $\alpha$, $\beta$, $\gamma$, $\gamma$ are numbers between 0 and 1), then the article score for an article, i, is $Score_i = (\alpha*Freshness + \beta*Views + \gamma*Likes + \varphi*Comments)$. It should be noted that the aforementioned article scoring model is just an example and other ways of computing the article score may be contemplated. The Freshness factor feature indicates the recency of the article, with newer articles being more interesting than older articles. The number of views, number of likes and number of comments are user activity signals on the article and represent the design variables.

The article score computed by the article score computation module 205.6 for each article identified for the user's request, is provided to the article ranker 205.7. The article ranker 205.7 uses the article score of all the identified articles to generate a ranked list of articles for the user, in response to the request for access to the website. The ranked list can be used by the article ranker 205.7 to identify a sub-set of articles for presenting to the user. The sub-set of articles are provided to the webpage generator 205.8, which uses the ranking to format and present the sub-set of articles on a webpage at a website, for user access. The webpage 102 is returned to the client device 100 of the user over the network 110, for rendering. The presented sub-set of articles is relevant to the user and also satisfy the business criteria. The article score is periodically verified or verified for each subsequent request and updated to reflect the changing dynamics of user behavior and traffic shaping requirements defined by the business objectives.

Figure 6A:
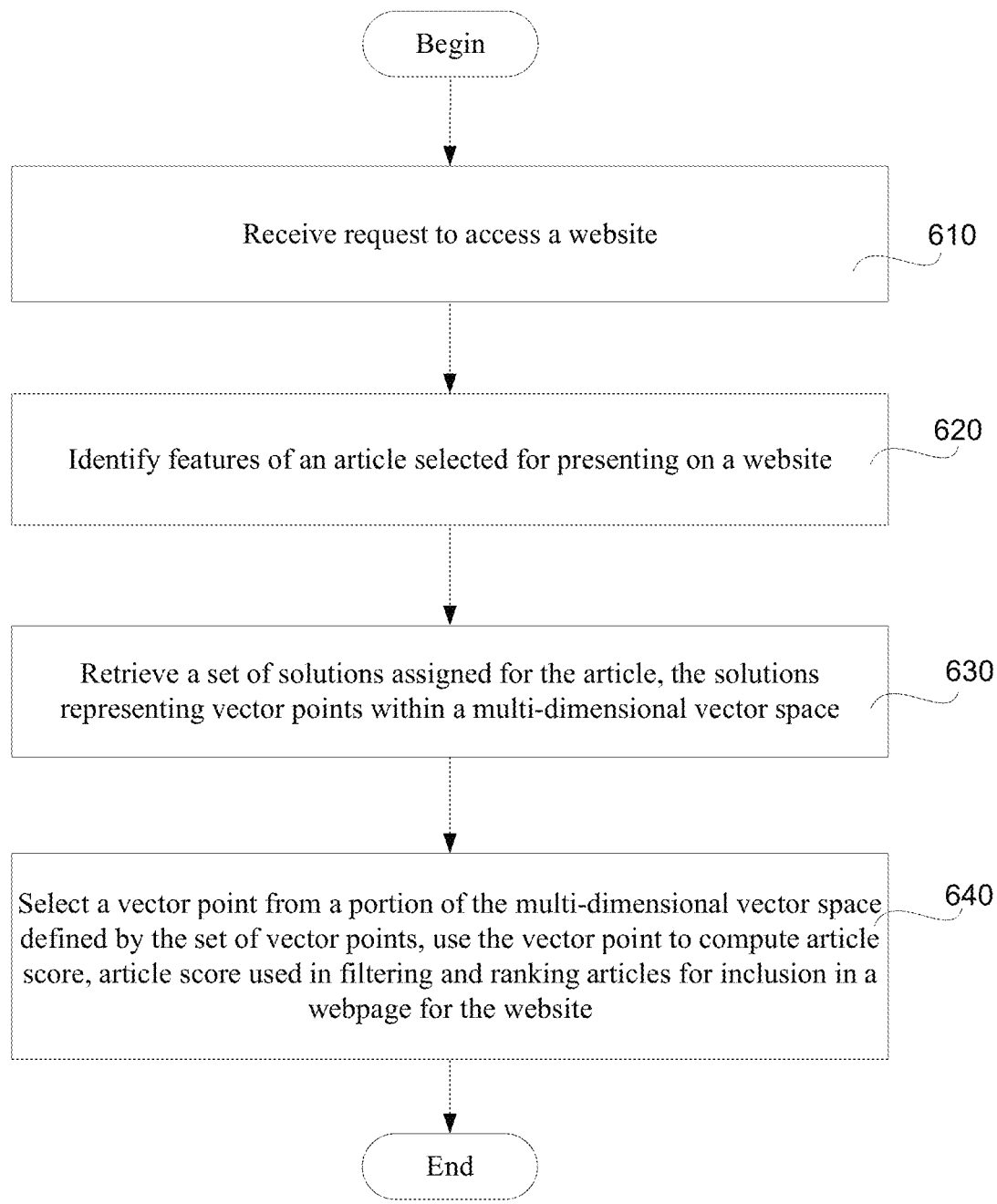
FIG. 6A illustrates a flow chart identifying method operations followed for determining optimal solution for an article of content identified for a user, in accordance with an embodiment of the invention.

With the general understanding of the various embodiments, a method for ranking an article will now be described with reference to FIG. 6A. The method begins at operation 610, wherein a request for accessing a website is received from a user account. The access request may be analyzed to identify user identifier and to verify user authentication, if any. The user identifier is used to obtain the user profile of the user. The user profile provides the usage history and user's preferences or interest on content at the website. The user preferences and user's interest are used to identify articles of content from a plurality of content sources, including online content, streaming content, game content, social media content, weblogs, pictures, etc.

The articles of content are analyzed to identify features of the articles, as illustrated in operation 620. The identified features are variables (objective variables and/or design variables) that are to be optimized for each article in order to satisfy the business objectives specified for the respective article. An optimization application is used to determine the features of the articles that need to be optimized.

An optimization application is used to retrieve a set of solutions assigned for an article of content identified for the user, as illustrated in operation 630. The optimization application may have generated and assigned the set of solutions for the article, while servicing a prior request from the user that includes the article. Each of the solutions in the set is represented by a vector point in a multi-dimensional vector space that identifies a set of values for the value parameters associated with the variables of the article, wherein the respective solution satisfies one or more objectives defined for the article. The set of solutions identify a set of Pareto Optimal solutions for the article.

A vector point is identified from a portion of the vector space identified by the set of solutions for the article, as illustrated in operation 640. In one embodiment, optimization application may perform a set of crossover operations by evaluating different vector points within the portion defined by the parent solutions. Each vector point within the portion represents an optimal point for one or more business objectives. The crossover operations identify an optimal solution from the portion of the vector space that best satisfies the overall business criteria (i.e., optimal for the objectives). The value parameters of the features of the article defined by the vector point corresponding to the optimal solution are used in computing an article score for the article. The article score may be computed as a function of the features and the corresponding value parameters associated with the features. In one embodiment, the function may be an additive function of the features and the corresponding value parameters. In another embodiment, the function may employ a different formula.

The article score of the plurality of articles is used to generate a ranked list of the articles identified for the user's request. From the ranked list, a sub-set of the articles are selected for rendering on the webpage. The type of article, relative ranking of the article and user preference of how the articles need to be presented are all taken into consideration in formatting the selected sub-set of articles for the user. The presented sub-set of articles identify the relevant articles for the user that best satisfy the multi-objective business criteria and include user preference.

Figure 6B:
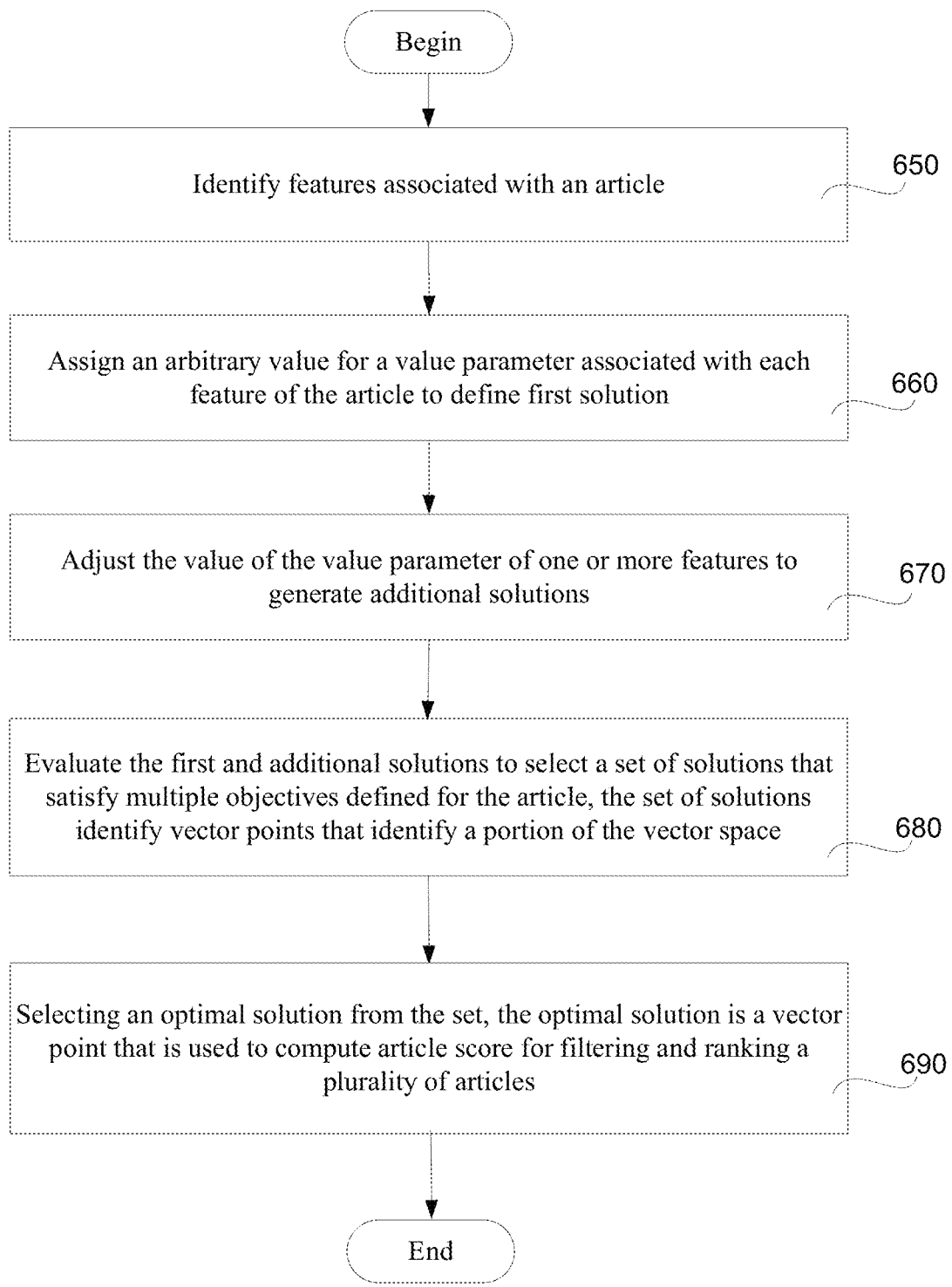
FIG. 6B illustrates a flow chart identifying method operations followed for determining optimal solution for an article of content identified for a user, in an alternate embodiment of the invention.

FIG. 6B illustrates an alternate method for ranking articles on a website, in one embodiment of the invention. In this embodiment, a set of solutions is generated for an article. The set of solutions are used to compute an article score. The article score of a plurality of articles is used for ranking the articles and to select a sub-set of the articles for including on a webpage of a website accessed by the user. The method begins at operation 650, when an article is analyzed to determine features that need to be optimized. The article may be a newly generated article of content that was generated by a user or a content producer. As the article is new, there are no assigned solutions for the article. The new article may have been one of a plurality of articles that were identified for the user's request. The content of the article may include any one of a webpage content, a streaming content, online content, game content, weblogs, social media posts, pictures, audio, etc.

The optimization application may initiate a mutator operator to generate a set of solutions for the article, wherein a solution is represented by a vector point within a multi-dimensional vector space defined by specific value parameters assigned for the variables of the article that satisfies one or more business objectives defined for the article. The mutator operator assigns an arbitrary value for the value parameter associated with each feature of the article to define a first solution, as illustrated in operation 660. The arbitrary values correspond to a vector point in the multi-dimensional vector space.

The mutator operator then performs additional mutation operations by adjusting the value parameter of one or more features of the article to generate additional solutions, as illustrated in operation 670. For example, during each mutation operation, the mutator operator may select to adjust value parameter of one feature, some features or all features of the article identified in the first solution to identify the additional solutions. Each of the additional solutions represents a distinct vector point in the multi-dimensional vector space.

The first and the additional solutions generated for the article are evaluated, as illustrated in operation 680. The evaluation causes identification of a set of solutions that satisfy multiple objectives defined for the article. Each solution in the set identifies a distinct vector point. In one embodiment, the set of solutions includes a pair of extreme solutions with each solution in the pair being a parent solution that best satisfies at least one of the multiple objectives of the article. It should be noted that due to multiple objectives, including conflicting objectives, defined for the article the solutions that are identified may not entirely satisfy all the objectives but may best satisfy the majority of the objectives. The pair of solutions is used to identify a portion of the vector space. The portion of the vector space identified by the pair is also multi-dimensional and includes vector points corresponding to majority of the solutions for the various objectives.

The optimization application may then select an optimal solution from within the portion of the vector space, as illustrated in operation 690, wherein the optimal solution is a vector point that lies between the two parent solutions defining the portion of the vector space. The optimal solution may be a linear solution in relation to the two parent solutions or may be a non-linear solution in relation to the two parent solutions within the multi-dimensional vector space. The optimal solution identified is used to derive an article score for the article. The optimization application then uses the article score of the plurality of articles to rank the articles and to identify a sub-set of articles for including in the webpage. The generation of the solutions for an article, identification of an optimal solution for the article, and ranking and filtering the plurality of articles are all done in an online setting, as and when a request to access the website is received from the user and such solutions account for the dynamic nature of the objectives.

The advantages of the various embodiments are numerous. For example, the solutions identified by the optimization application take into consideration the dynamic nature of the objectives and provide solutions that best satisfy the multiple objectives. These solutions are identified in substantial real-time using online data and under the settings where the objectives and the constraints can dynamically change, such that each user is presented with the most relevant content, enhancing the user's online experience. The solutions assigned to the article identify a portion of the multi-dimensional vector space where the bulk of solutions are present and have to be explored and other portions of the multi-dimensional vector space with sub-optimal solutions that can be avoided or not explored. The optimization application provides a mutator operator to diversify from the narrow range identified by assigned solutions, when alternate solutions need to be identified for the article, and a crossover operator to fine-tune the set of solutions to identify a local optimal solution. The optimization application is robust enough to accommodate addition, deletion or changes to objectives, constraints, and also easily accommodate variation in the number of value parameters associated with the objectives without having to re-write the application logic. When an objective is to be deleted or to be ignored, the corresponding value parameter may be set to zero so as to force the optimization application logic to not explore solutions based on the featured value parameter. Similarly, additional objectives may be considered by defining a number of multi-dimensional variables that are greater than the actual list of features considered currently and setting these additional variables to zero initially. As and when additional objectives are being defined, the value parameters for the corresponding additional features can be adjusted to non-zero values.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network. A sample computer system identifying the backend server infrastructure used to power the content host server 200 of FIG. 1, is depicted in FIGS. 7A-7C.

Figure 7A:
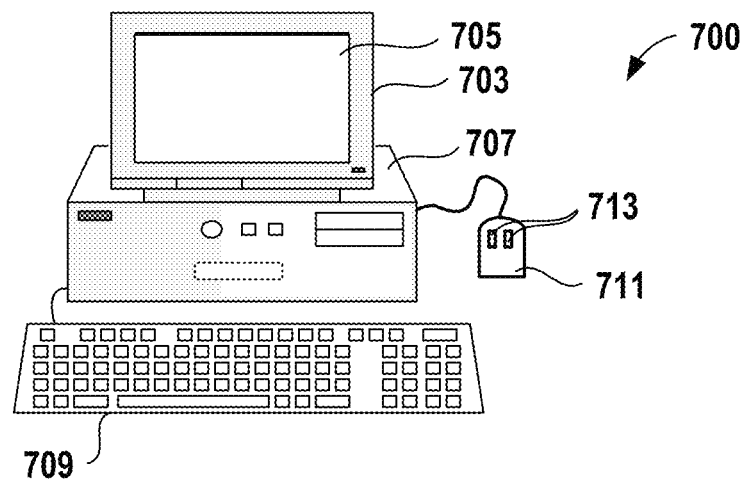
FIG. 7A is a generalized diagram of a typical computer system suitable for use with the present invention.

In FIG. 7A, is an illustration of an embodiment of an exemplary computer system 700 suitable for use with the present invention including display 703 having display screen 705. Cabinet 707 houses standard computer components (not shown) such as a disk drive, CDROM drive, display adapter, network card, random access memory (RAM), central processing unit (CPU), and other components, subsystems and devices. User input devices such as a mouse 711 having buttons 713, and keyboard 709 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 7B:
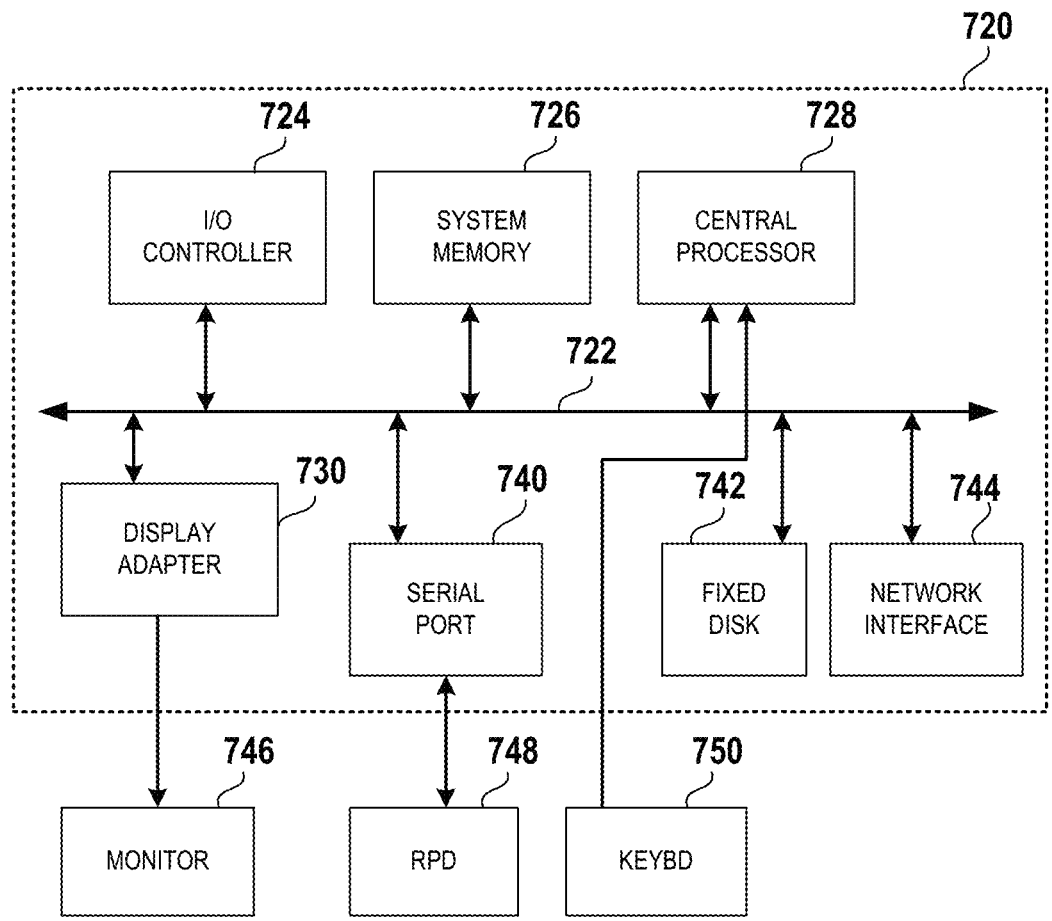
FIG. 7B shows subsystems in the typical computer system of FIG. 7A.
Figure 7C:
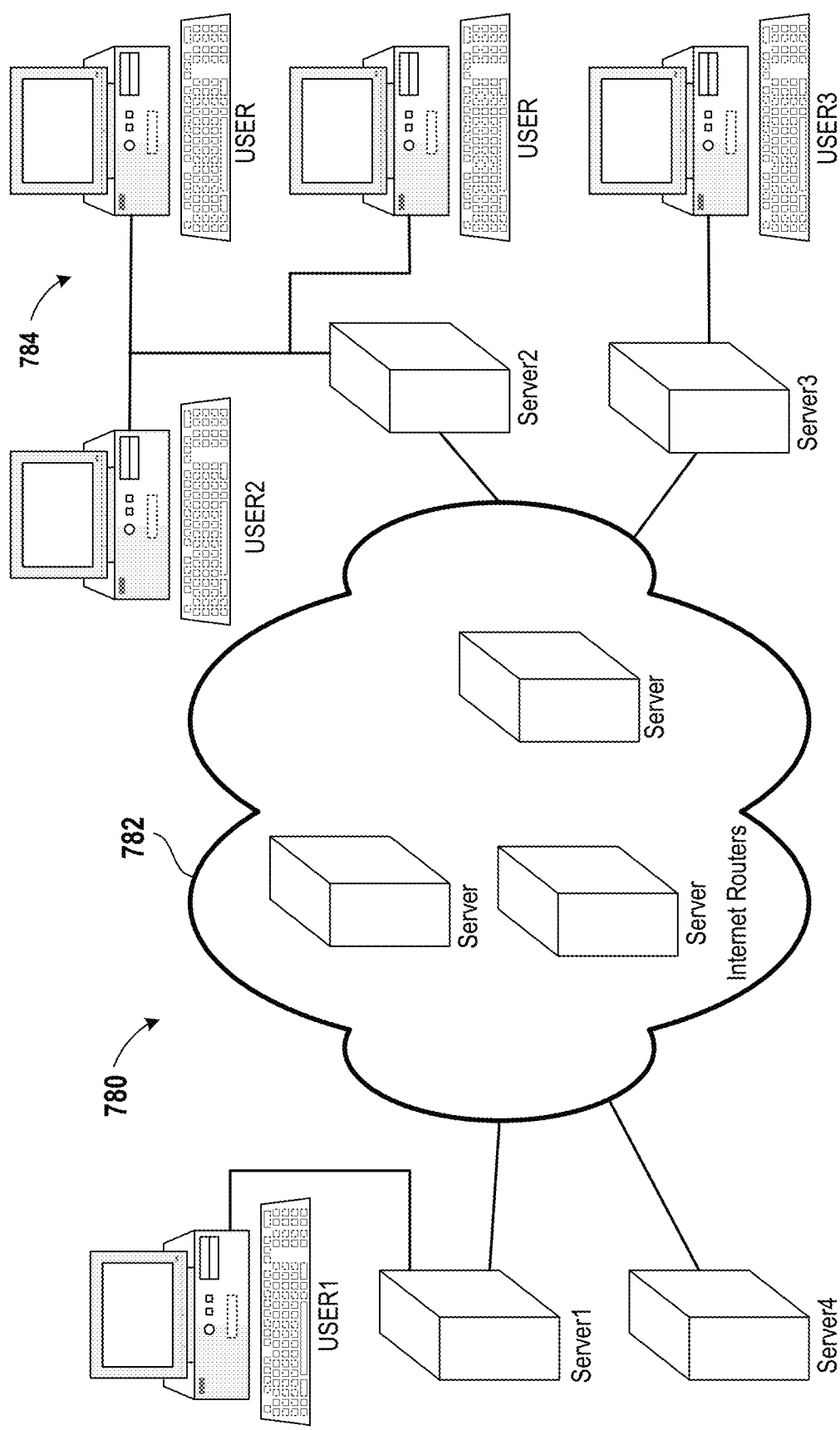
FIG. 7C is a generalized diagram of a typical network suitable for use with the present invention.

FIG. 7B illustrates an exemplary subsystems that might typically be found in a computer such as computer 700. In FIG. 7B, subsystems within box 720 are directly interfaced to internal bus 722. Such subsystems typically are contained within the computer system such as within cabinet 707 of FIG. 7A. Subsystems include input/output (I/O) controller 724, System Random Access Memory (RAM) 726, Central Processing Unit (CPU) 728, Display Adapter 730, Serial Port 740, Fixed Disk 742 and Network Interface Adapter 744. The use of bus 722 allows each of the subsystems to transfer data among the subsystems and, most importantly, with the CPU. External devices can communicate with the CPU or other subsystems via the bus 722 by interfacing with a subsystem on the bus. Monitor 746 connects to the bus through Display Adapter 730. A relative pointing device (RPD) 748 such as a mouse connects through Serial Port 740. Some devices such as a Keyboard 750 can communicate with the CPU by direct means without using the main data bus as, for example, via an interrupt controller and associated registers (not shown).

As with the external physical configuration shown in FIG. 7A, many subsystem configurations are possible. FIG. 7B is illustrative of but one suitable configuration. Subsystems, components or devices other than those shown in FIG. 7B can be added. A suitable computer system can be achieved without using all of the subsystems shown in FIG. 7B. For example, a standalone computer need not be coupled to a network 112 so Network Interface 744 would not be required. Other subsystems such as a CDROM drive, graphics accelerator, etc. can be included in the configuration without affecting the performance of the system of the present invention.

FIG. 7C is a generalized diagram of a typical network. In FIG. 7C, the network system 780 includes several local networks coupled to the Internet. Although specific network protocols, physical layers, topologies, and other network properties are presented herein, embodiments of the present invention are suitable for use with any network.

In FIG. 7C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to a network 112, such as the Internet. The Internet is shown symbolically as a collection of server routers 782. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 784 are shown utilizing a local network at a different location from USER1 computer. The computers at 784 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or personal information manager (also referred to as a "PIM") smart cellular or other phone, so-called smart card, set-top box, or any of the like. A "computer program" may include any suitable locally or remotely executable program or sequence of coded instructions which are to be inserted into a computer, well known to those skilled in the art.

Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, carrier wave, or computer memory. The computer readable medium may have suitable instructions for synchronously presenting multiple video program ID streams, such as on a display screen, or for providing for input or presenting in accordance with various embodiments of the present invention.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for ranking a plurality of articles for rendering on a website for a user account, comprising:
receiving a request for accessing the website;
identifying features associated with the plurality of articles selected for rendering on the website based on a user profile associated with the user account, each feature is associated with a value parameter with a value defined within a multi-dimensional vector space;

retrieving a pair of solutions assigned to an article of the plurality of articles, each solution in the pair of solutions identifying a distinct vector point within the multi-dimensional vector space that correlates with a specific set of values for value parameters associated with the features of the article, the pair of solutions identifying a portion of the multi-dimensional vector space;

verifying that the pair of solutions assigned to the article satisfies multiple objectives defined for the article and one or more constraints defined for the article, wherein the multiple objectives each correspond to a goal of an entity and the one or more constraints each correspond to a contractual understanding between the entity and a second entity, wherein the multiple objectives comprise at least one of maximizing dwell-time, maximizing click-through rates (CTR), minimizing CTR, or maximizing daily active users, wherein the one or more constraints comprise one or more traffic shaping requirements defined by a contract between the entity and the second entity;

selecting a vector point from within the portion of the multi-dimensional vector space identified by the pair of solutions, upon successful verification, the vector point defining an optimal solution for the article, the optimal solution of the article used in computing an article score for the article, wherein the article score of each of the plurality of articles is used to rank the plurality of articles, the ranking of the plurality of articles used in selection and presentation of a subset of articles on the website for the user account; and updating the article score based on one or more changes to at least one of the multiple objectives defined for the article or the one or more constraints defined for the article, wherein the updating is based on one or more changes to the one or more traffic shaping requirements, wherein operations of the method are performed by a processor.

2. The method of claim 1, comprising:

when the pair of solutions assigned to the article does not satisfy the multiple objectives with the one or more constraints defined for the article, adjusting the value parameters associated with one or more features identified in one solution or both solutions of the pair of solutions for the article to generate new solutions, each of the new solutions associated with a distinct new vector point;

evaluating the new solutions to identify a pair of new solutions that satisfy the multiple objectives with the one or more constraints for the article, the pair of new solutions used to identify a different portion of the multi-dimensional vector space; and selecting a new optimal solution from within the different portion of the multi-dimensional vector space, the new optimal solution corresponds to a specific vector point within the different portion of the multi-dimensional vector space and replaces the optimal solution for the article.

3. The method of claim 2, wherein adjusting the value parameters associated with the one or more features of the article is performed when a change is detected in at least one of the multiple objectives or the one or more constraints for the article.

4. The method of claim 2, wherein adjusting the value parameters comprises performing a mutation operation to identify new vector points with one or more value parameters for the features of the article that are outside the portion of the multi-dimensional vector space identified by the pair of solutions, wherein the mutation operation is performed when a change in one or more objectives is detected.

5. The method of claim 1, wherein selecting the vector point comprises performing a crossover operation to identify a new vector point from within the portion of the multi-dimensional vector space identified by the pair of solutions, the new vector point corresponds to a new optimal solution, which replaces the optimal solution.

6. The method of claim 1, wherein the optimal solution is linear or non-linear in relation to the pair of solutions and is represented using one or more value parameters that correspond with the distinct vector point in the portion of the multi-dimensional vector space.

7. The method of claim 1, wherein when there is no pair of solutions assigned for the article, determining the pair of solutions for assigning to the article, wherein the determining comprises:

assigning an arbitrary value for the value parameter associated with each of the features of the article to generate a first solution;

varying the value for the value parameter for each of the features for the article to generate additional solutions;

evaluating the first solution and the additional solutions for the article to identify the pair of solutions with vector points within the multi-dimensional vector space that satisfy the multiple objectives with the one or more constraints, wherein the pair of solutions for the article identify the portion of the multi-dimensional vector space; and assigning the pair of solutions to the article.

8. The method of claim 1, wherein the multi-dimensional vector space is defined by one or more values of one or more value parameters of all the features of the plurality of articles, wherein each of the one or more value parameters is defined by a number that is between 0 and 1, and the portion of the multi-dimensional vector space identified by the pair of solutions is less than an entire multi-dimensional vector space.

9. The method of claim 1, wherein each solution in the pair of solutions defined for each article of the plurality of articles is a Pareto optimal solution.

10. The method of claim 1, wherein an increase associated with a first objective of the multiple objectives corresponds to a decrease associated with a second objective of the multiple objectives.

11. The method of claim 10, wherein the first objective comprises the maximizing the CTR and the second objective comprises the maximizing the dwell-time.

12. The method of claim 1, wherein the verifying comprises:

monitoring user activities on the article rendered on the website; and determining if the user activities match one or more objectives of the multiple objectives defined for the article.

13. A method for ranking a plurality of articles on a website for a user, comprising:

identifying features associated with the plurality of articles, each feature is associated with a value parameter having a value defined within a multi-dimensional vector space;

assigning an arbitrary value for the value parameter associated with each of the features of an article of the plurality of articles to define a first solution, the first solution corresponds to a first vector point in the multi-dimensional vector space;

adjusting the value parameter of one or more features identified in the first solution to generate additional solutions for the article, each of the additional solutions corresponds to a distinct vector point in the multi-dimensional vector space;

evaluating the first solution and the additional solutions generated for the article to identify a pair of solutions for the article, each solution of the pair of solutions identifying a specific vector point within the multi-dimensional vector space, the pair of solutions identifying a portion of the multi-dimensional vector space that satisfy multiple objectives defined for the article and one or more constraints of the article, the pair of solutions assigned to the article, wherein the multiple objectives each correspond to a goal of an entity and the one or more constraints each correspond to a contractual understanding between the entity and a second entity;

selecting a vector point from within the portion of the multi-dimensional vector space identified by the pair of solutions, the vector point defining an optimal solution for the article, the optimal solution of the article used in computing an article score, wherein the article score of each of the plurality of articles is used to rank the plurality of articles selected for the user based on a user profile of the user, wherein the ranking of the plurality of articles used in the selection and presentation of a subset of articles on a webpage of the website for the user; and updating the article score based on one or more changes to at least one of the multiple objectives defined for the article or the one or more constraints defined for the article, wherein the updating is based on one or more changes to one or more traffic shaping requirements, wherein operations of the method are performed by a processor.

14. The method of claim 13, wherein the pair of solutions assigned to the article represent parent solutions and is evaluated every time the user requests access to the webpage on the website for which the article is considered for inclusion, the evaluating of the parent solutions comprises adjusting one or more value parameters of the one or more features for the article to define a new pair of solutions, when the evaluation determines the pair of solutions do not satisfy at least one of one or more objectives of the multiple objectives or the one or more constraints for the article, wherein the new pair of solutions represent children solutions and are assigned to the article, the children solutions are used to find a new optimal solution for the article.

15. The method of claim 13, wherein the multi-dimensional vector space is defined by one or more values of one or more value parameters of all features of the plurality of articles, wherein each of the one or more value parameters is defined by a number that is between 0 and 1.

16. The method of claim 13, wherein each solution in the pair of solutions defined for each article of the plurality of articles is a Pareto optimal solution.

17. The method of claim 13, wherein the multiple objectives and the one or more constraints are dynamic in nature.

18. The method of claim 13, the features of the article comprise at least one of content-based features or user-activity-based features.

19. A system for ranking a plurality of articles on a website, comprising:
a server connected over a network to a client device for receiving request for access to the website, the server executing an optimization application, wherein the optimization application comprises:
a vector point identifier that is configured to identify features associated with the plurality of articles, and to identify a set of vector points within a multi-dimensional vector space for an article within the plurality of articles, the multi-dimensional vector space defined by all value parameters of all the features of the plurality of articles;
a vector point evaluator that is configured to evaluate the set of vector points to identify a pair of solutions that satisfy multiple objectives defined for the article and one or more constraints defined for the article, wherein the multiple objectives comprise at least one of maximizing dwell-time, maximizing click-through rates (CTR), minimizing CTR, or maximizing daily active users, wherein the one or more constraints comprise one or more traffic shaping requirements defined by a contract between an entity and a second entity;
a vector space identifier that is configured to identify a portion of the multi-dimensional vector space encompassing the pair of solutions identified for the article and to select an optimal solution for the article from within the portion of the multi-dimensional vector space, wherein the optimal solution is defined by a vector point having a specific set of value parameters for the features of the article;
an article score computation module that is configured to compute an article score for the article using the value parameters for the features defined by the optimal solution;
a module that is configured to update the article score based on one or more changes to at least one of the multiple objectives defined for the article or the one or more constraints defined for the article, wherein the updating is based on one or more changes to the one or more traffic shaping requirements; and
an article ranker that is configured to rank the plurality of articles based on computed article scores, the ranking of the plurality of articles is used in filtering the plurality of articles to identify a subset of articles that are to be included on a webpage of the website.

20. The system of claim 19, wherein the vector point identifier comprises:
a mutator operator that is configured to identify vector points for the article, that are outside the portion of the multi-dimensional vector space defined by the pair of solutions for the article, and
a crossover operator that is configured to identify an alternate optimal solution for the article from within the portion of the multi-dimensional vector space.

* * * * *